US008848739B2

(12) United States Patent
Petersen

(10) Patent No.: US 8,848,739 B2
(45) Date of Patent: Sep. 30, 2014

(54) EFFICIENT SWITCH FABRIC BANDWIDTH DISTRIBUTION

(75) Inventor: Brian A. Petersen, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 699 days.

(21) Appl. No.: 12/622,873

(22) Filed: Nov. 20, 2009

(65) Prior Publication Data

US 2010/0272123 A1 Oct. 28, 2010

Related U.S. Application Data

(60) Provisional application No. 61/173,325, filed on Apr. 28, 2009.

(51) Int. Cl.
| | |
|---|---|
| *H04L 12/861* | (2013.01) |
| *H04L 12/931* | (2013.01) |
| *H04L 12/801* | (2013.01) |
| *H04L 12/933* | (2013.01) |

(52) U.S. Cl.
CPC ............ *H04L 49/101* (2013.01); *H04L 49/35* (2013.01); *H04L 49/00* (2013.01); *H04L 47/10* (2013.01)
USPC .......................................... 370/474; 370/393

(58) Field of Classification Search
CPC .................................................... H04L 45/245
USPC .................. 370/392–393, 419–420, 471, 474
See application file for complete search history.

(56) References Cited

U.S. PATENT DOCUMENTS

| | | | | |
|---|---|---|---|---|
| 5,511,168 | A * | 4/1996 | Perlman et al. ............... | 709/243 |
| 6,292,494 | B1 * | 9/2001 | Baker et al. .................. | 370/459 |
| 6,650,639 | B2 * | 11/2003 | Doherty et al. ............... | 370/389 |
| 6,658,006 | B1 * | 12/2003 | Chen et al. ................. | 370/395.1 |
| 6,788,686 | B1 * | 9/2004 | Khotimsky et al. ........... | 370/394 |
| 8,001,280 | B2 * | 8/2011 | Blumrich et al. ............. | 709/252 |
| 2009/0147781 | A1 * | 6/2009 | Lee et al. ...................... | 370/389 |
| 2009/0252168 | A1 * | 10/2009 | Okuno et al. .............. | 370/395.1 |

OTHER PUBLICATIONS

Chiussi, F. et al., Advanced Frame Recovery in Switched Connection Inverse Multiplexing for ATM, 2nd international conference on ATM, ICATM'99, Jun. 21-22, 1999, pp. 404-412.*

* cited by examiner

*Primary Examiner* — Benjamin Lamont
(74) *Attorney, Agent, or Firm* — McDermott Will & Emery LLP

(57) ABSTRACT

According to one general aspect, a method may include receiving at least a portion of a packet of data by an ingress device. The method may include determining an egress device to receive the packet. In some embodiments, the method may include dividing the received portion of the packet into a plurality of segments. The method may include editing, for each segment, a header to include an address field that indicates the address of the egress device, wherein the header is associated with a current segment. The method may include, for each segment, editing the header to include a next link field that indicates a link that will be used to transmit the next segment of the packet. The method may also include transmitting the current segment and header to the egress device via the link indicated in the next link field of the header of a preceding segment.

19 Claims, 7 Drawing Sheets

100

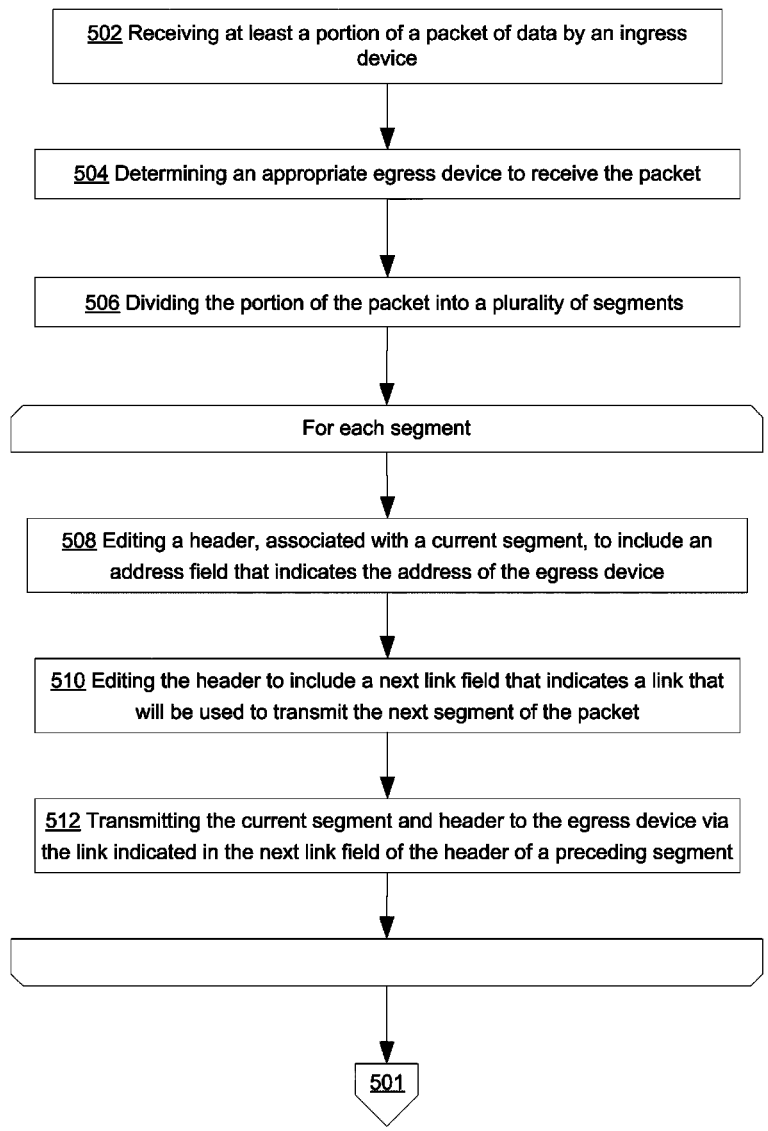

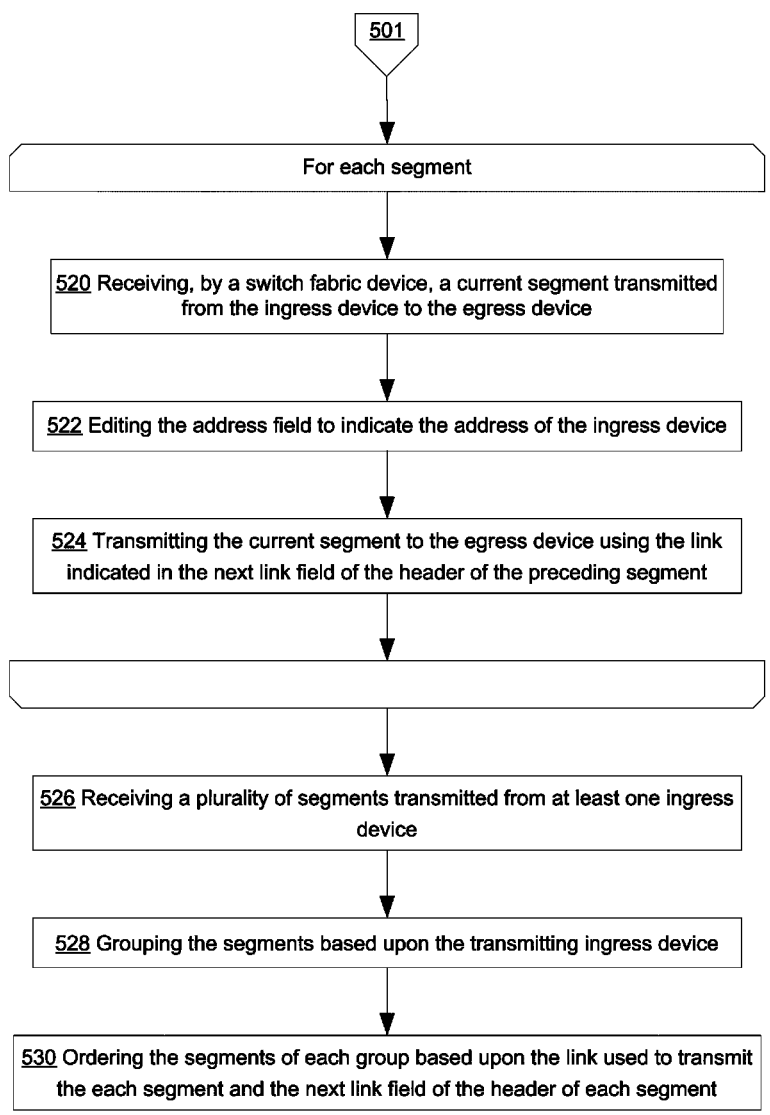

US 8,848,739 B2

EFFICIENT SWITCH FABRIC BANDWIDTH DISTRIBUTION

CROSS-REFERENCE TO RELATED APPLICATION

This application claims priority under 35 U.S.C. §119 to U.S. Provisional Patent Application 61/173,325, filed Apr. 28, 2009, titled "EFFICIENT SWITCH FABRIC BANDWIDTH DISTRIBUTION," which is incorporated herein by reference in its entirety.

TECHNICAL FIELD

This description relates to the communication of information, and more specifically the communication of information via a switch or other network routing device.

BACKGROUND

Often when a switch device or network routing device of receives a data packet or frame, it chooses one of several internal links across which to transmit the packet from its ingress port to its intended egress port. Frequently, a technique akin to link aggregation may be used to make that link selection decision. Specifically, often certain flow-identifying fields in the packet are hashed and the hash result is reduced to an interface selection.

Hashes, although often easy to compute, are unable to avoid collisions where a several different inputs may result in identical hash values. These collisions may cause a disproportionate amount of traffic to utilize one of the several available internal links. Frequently this problem is exacerbated when the number of data flows is limited. For example, if a switching device is handling a single very high bandwidth data flow, the hash-based link selection algorithm may frequently direct every packet to the same link. In such an embodiment, if eight links are available within the device, then only 12.5% of the potential switch fabric bandwidth will be utilized by the flow.

A popular alternative to the packet- and hash-based switch fabric interface method is to segment packets into cells and then distribute the cells in a round-robin or other fair scheme among the switch fabric devices. Cross-bar switching methods or embedded sequence numbers may be used to ensure that the cells are reassembled in the right order to reconstitute the original packets.

SUMMARY

A system and/or method for communicating information, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
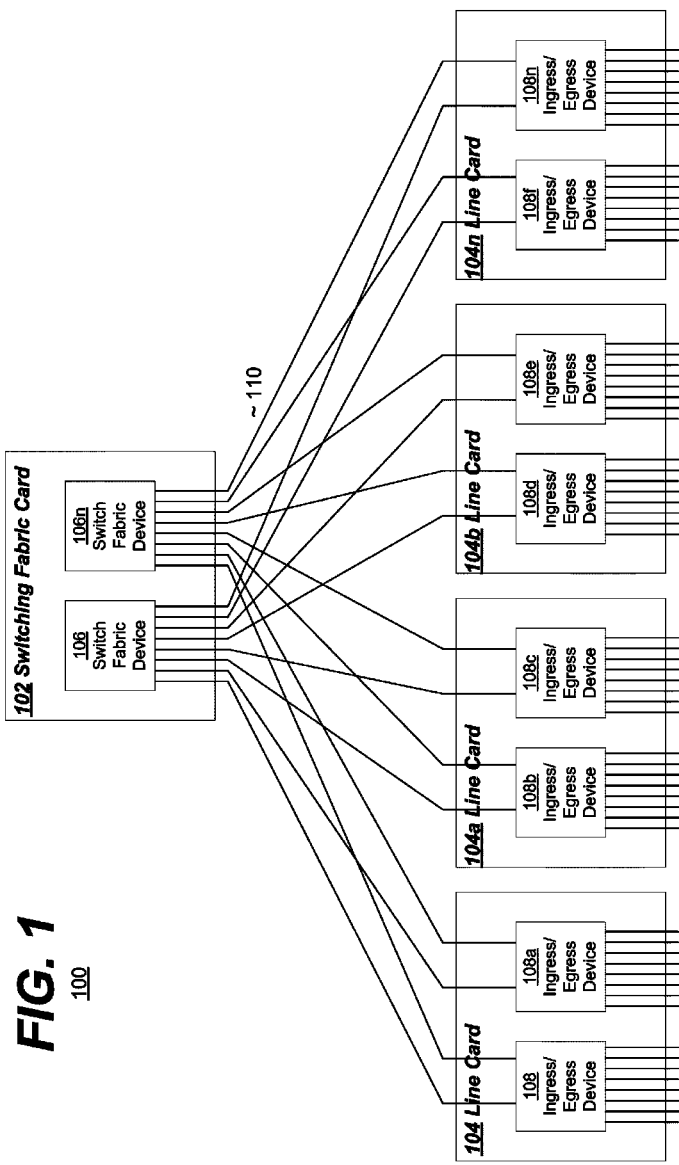
FIG. 1 is a block diagram of an example embodiment of a system in accordance with the disclosed subject matter.

FIG. 1 is a block diagram of an example embodiment of a system 100 in accordance with the disclosed subject matter. In various embodiments, a system or network routing device 100 may include a plurality of line cards 104 (e.g., line cards 104, 104a, 104b, and 104n, etc.), and at least one switching fabric card 102. In some embodiments, these cards may include modular removable cards, such that the capabilities and/or capacities of the system or network routing device 100 may be easily altered with relative convenience.

In some embodiments, each of the line cards 104 may include a number ingress and/or egress devices 108 (e.g., ingress/egress devices 108, 108a, 108b, 108c, 108d, 108e, 108f, 108n, etc.) configured to receive (as an ingress) and transmit (as an egress) packets or other forms of data (e.g., frames) from/to other network devices. For example, in one embodiment, the system 100 may include a network routing device that relays and routes data from a source device that generated the data to a destination device that will receive the data, or any other intermediate in between.

In some embodiments, the switching fabric card 102 may include a number of switch fabric devices (e.g., switch fabric devices 106 and 106n) that are configured to route data packets received by an ingress device 108 to a proper egress device 108. In one embodiment, the proper egress device 108 may be the egress device 108 that will transmit the data to or towards, in a topological sense, the final destination device.

In various embodiments, these ingress/egress devices 108 and the switch fabric devices 106 may be commutatively coupled via links 110. In the illustrated embodiment, the devices 106 and 108 may be coupled such that any device may transmit or receive data from any other device 106 or 108 in the system. It is understood that each of these links may include various physical or artificial bandwidth restrictions or limitations, such that the links are not infinitely fast. In such an embodiment, it may be desirable to make use of the links 110 in such a way as to maximize the amount of bandwidth utilized by the system 100 as a whole.

For example, while it make be simple to select and only use one set of links between a given ingress device (e.g., ingress device 108a) and a given egress device (e.g., egress device 108n), for example via switch fabric 106n, such a use may not maximize or improve the use of system 100 resources. For example, two links (e.g., one using switch fabric device 106, and the other using switch fabric device 106n) between the two devices 108 may be substantially simultaneously employed to increase the rate of data transferred between the two devices 108.

In various embodiments, each of the ingress/egress devices 108 may be substantially identical or substantially from a single product line or conform to a given networking standard. For example, in one embodiment, the ingress/egress devices 108 may each be copies of the same integrated circuit (IC) operating in different modes (e.g., ingress mode, or egress mode). Likewise, in various embodiments, the switch fabric devices 106 may also include the same IC as the ingress/egress devices 108 but operating in a third mode. In various embodiments, these modes may be dynamically selectable. In another embodiment, the selection of these modes may be hardwired (e.g., via a pin or interconnect from the IC to a circuit board, etc.). In various embodiments, the ICs may be configured to operate in one or more modes substantially simultaneously. It is understood that the above are merely a few illustrative examples to which the disclosed subject matter is not limited.

Figure 2:
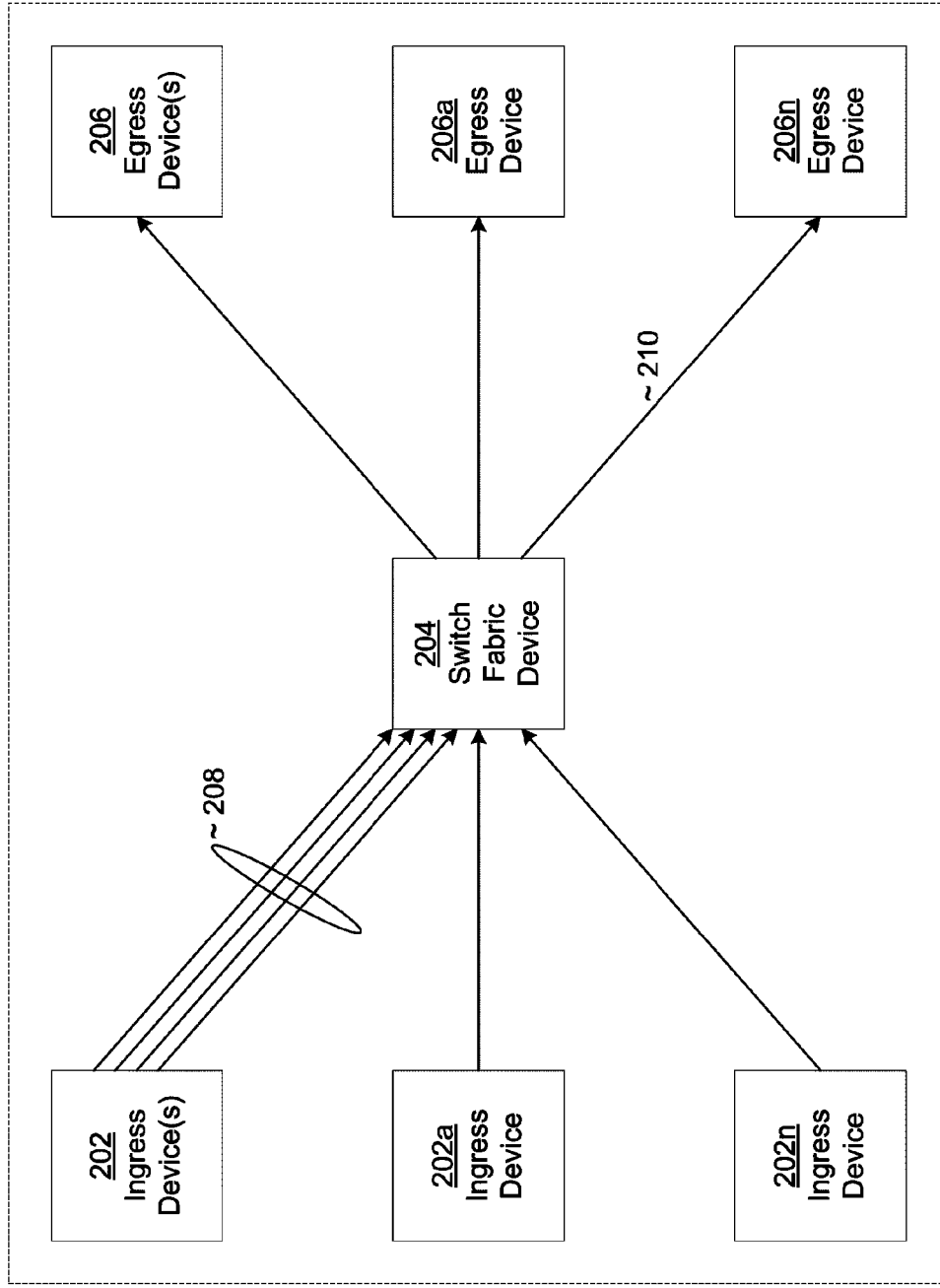
FIG. 2 is a block diagram of an example embodiment of a system in accordance with the disclosed subject matter.

FIG. 2 is a block diagram of an example embodiment of a system 200 in accordance with the disclosed subject matter. In various embodiments, the system 200 may include a plurality of ingress devices (e.g., ingress devices 202, 202a, and 202n, etc.), at least one switch fabric device 204, and a plurality of egress devices (e.g., egress devices 206, 206a, and 206n, etc.). In various embodiments, the system 200 may include the system 100, but merely be illustrated in a simplified fashion; although, it is understood that the above is merely one illustrative example to which the disclosed subject matter is not limited.

In various embodiments, the ingress devices 202 may be commutatively coupled with the switch fabric device 204 via a number of ingress links 208. In the illustrated embodiment, the ingress links 208 may include a plurality of links (e.g., 4 serial/deserializer or SerDes links, etc.). In some embodiments, the egress devices 206 may be commutatively coupled with the switch fabric device 204 via a number of egress links 210 (which, again may include a number of links, not explicitly shown.). In various embodiments, these links 208 and 210 may include high speed or HiGig links capable or rated to transmit data at relatively high speeds compared to the networking links external to the system. For example, in various embodiments, the links 208 or 210 may be configured to transmit data at a rate of 40 or 100 Gbps; although, it is understood that the above are merely a few illustrative examples to which the disclosed subject matter is not limited.

In one embodiment, when a packet or other data grouping (e.g., a frame) is received by the ingress device 202, the ingress device 202 may determine the appropriate egress device to receive the packet (e.g., egress device 206n). In various embodiments, an egress device may be considered "appropriate" if the egress device is capable of transmitting the packet towards, in a topological sense, the final destination device in a relatively efficient manner. In various embodiments, this determination may be based upon a routing table, the networking device commutatively coupled to the system 200 via a particular egress device, etc.

Figure 4:
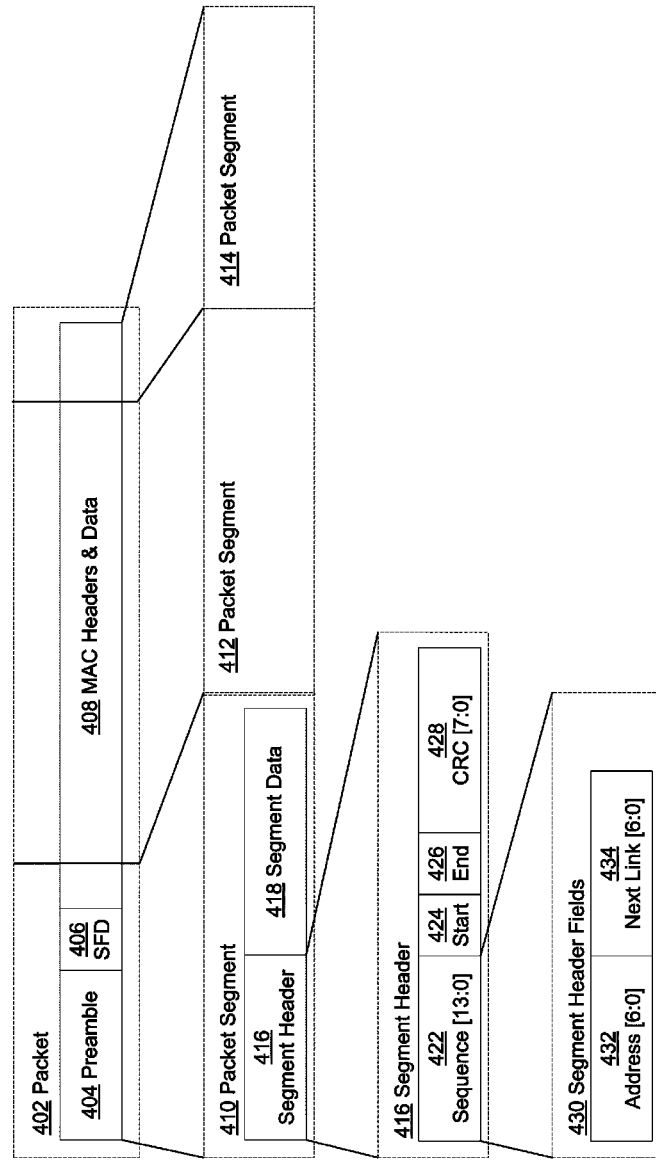
FIG. 4 is a block diagram of an example embodiment of a packet in accordance with the disclosed subject matter.

In various embodiments, the ingress device 202 may divide at least the received portion of the packet into a plurality of segments or cells (illustrated more fully in FIG. 4). In various embodiments, these segments may be as long as 256 bytes; although, it is understood that the above is merely one illustrative example to which the disclosed subject matter is not limited. In various embodiments, the ingress device 202 may utilize as few segments as possible. In some embodiments, these segments may then be transmitted, via the switch fabric device 204 to the selected egress device 206.

In various embodiments, upon receipt at the egress device 206, these segments may be reassembled into the data packet, or a derivative thereof, and then transmitted towards the final destination device.

In various embodiments, these segments may be received at the egress device 206 out of order. For example, in some embodiments, some of the segments may have traveled from the ingress device 202 to the egress device 206 via different links, and therefore faced different levels of congestion along the way. Therefore, in various embodiments, the segments may include sequencing information to facilitate the reassembly of the segments by the egress device 206.

In one embodiment, the ingress device 202 may add a header to each segment. In some embodiments, this segment header may include an address field or portion configured to indicate the egress device to which the segment is destined. It is understood that the ingress device 202 may be transmitting several segments to various egress devices (e.g., egress devices 206a and 206n) substantially simultaneously.

In a preferred embodiment, the header may include a single address field or portion. This is contrasted with a more typical (e.g., Ethernet, etc.) header address portion which includes both a source address and a destination address. In the illustrated embodiment, the ingress device 202 may only include a destination address field or portion as the source of the segment is inherent or derivable from the link or SerDes 208 upon which the segment is transmitted. For example, as a given link 208 is hardwired to only one ingress device (e.g., ingress device 202) any segments transmitted via the link can be assumed to have come from the ingress device 202; therefore, space within the header may be conserved by forgoing a source address field or portion thereof.

In various embodiments, the ingress device 202 may add or edit the header to include a next link field or portion that is configured to indicate a link that will be used to transmit the next segment of the packet. In various embodiments, this may be considered to be a pointer to the next segment, similarly to a pointer to a next object in a linked list.

In various embodiments, this next link field may function differently from a sequential numbering scheme. In some embodiments of a sequential segment numbering scheme, each segment may be given a substantially unique number, and those numbers may be ordered such that the order may be used by the egress device 206 to reassemble the segments into a packet. However, one disadvantage of a sequential numbering scheme is that the maximum tolerable skew between segments is limited to the number of bits used to encode the segment number. For example, if 7 bits are used to number the segments, the maximum skew allowed between segments is $2^7$ or 128 segments.

Conversely, if a next link field is employed, the maximum amount of skew that the system can tolerate is no longer bounded by the number of bits employed for segment order. Instead, the number of bits employed for segment ordering is related to the number of links in the system 200 between any egress device 206 and the switch fabric device(s) 204, or "switch fabric interfaces". For example, for a 7-bit next link field the system 200 may include up to 128 links to an egress device 206. It is understood that the above 7-bits is merely an illustrative example to which the disclosed subject matter is not limited.

In a preferred embodiment, a next link field (versus a sequential segment numbering system) may accommodate a much larger skew between first and last segment of a packet. Furthermore, in such an embodiment, a limiting factor for a next link scheme may be the number of links (e.g., links 208 and 210) within a system (e.g., 128 links) and not the worst=case skew between segments. Also, in such an embodiment, the ability to actively select which link will carry a segment (as opposed to a simple round robin link selection scheme) may increase a system's ability to efficiently process data or packets.

In some embodiments, by employing a single address field and a next link field (versus a sequential segment numbering system) the size of the header may be reduced, compared to a more traditional header scheme which uses a paired source/destination address field and a comparatively wider segment number field. In such an embodiment, half of the paired source/destination address field may be removed, and the next link field may be sized to accommodate the smaller number of links (e.g., links 208 and 210) in the system as opposed to a segment number field which is generally sized to accommodate the largest possible skew between segments. In a preferred embodiment, these reductions in the size of the header (compared to a more traditional header scheme) may result in a lower overhead for segment transmission as the percentage of packet data comprising the segment is increased.

In some embodiments, the integrity of the packet itself may be handled by the packet's own error checking (e.g., CRC) scheme. Although, it is understood that the above is merely one illustrative example to which the disclosed subject matter is not limited.

In various embodiments, the scheme employed by the ingress device 202 to select the next link for a segment to travel may be based upon whatever technique provides the most efficient utilization of the available links. In some embodiments, failed or broken links may not be chosen.

In various embodiments, as each segment or fragment is prepared for transmission, the identity of the next link to be used for segment or fragment addressed to the same destination may be determined. This next-link information, in one embodiment, may be embedded in the current segment's or fragment's header, as described above. In such an embodiment, when the next segment for the same source/destination pair is transmitted toward the switch fabric, it may be restricted to using the link advertised in its predecessor fragment; even if a different link may currently be a more optimal choice.

In various embodiments, these sub-optimal link choices may only be likely to occur when a gap in traffic between a source/destination pair appears. For example, when the last segment prior to the gap was transmitted, a certain next link may have been promised to the egress device. However, after the transmission gap and the resumption of transmission the circumstances may have changed (e.g., some link congestion may no longer exist, etc.) such that a new non-promised link may now be optimal for transmission. However, in various embodiments, the resuming segment may be transmitted via the promised next link and not whatever link is currently most optimal. In some embodiments, only the first fragment or segment of a burst after a quiet period may suffer from this potentially sub-optimal link choice. In such an embodiment, once the burst is under way, the state of the links may be considered in real time when making next link choices for subsequent fragments or segments.

In various embodiments, upon the receipt of the segment or fragment by the switch fabric device 204, the address field of the header may be read to determine which egress device 206 to send the segment to. In various embodiments, the switch fabric device 204 may employ the next link field from a previous segment to determine upon which link the current segment will be transmitted. In another embodiment, the switch fabric device 204 may employ the same technique as the ingress device 202 to determine which link to employ, such that the selection of links is substantially identical and the promised link for the previous segment's next link field is fulfilled.

In one embodiment, prior to transmitting the segment to egress device 206, the switch fabric 204 may be configured to edit the address field of the header to include an indication of which ingress device 202 originally transmitted the segment. In various embodiments, the address of the destination egress device 206 may no longer be useful as a link may include a fixed point-to-point communication medium such that if the egress link 210 upon which the segment transmitted is known the egress device is known. Likewise, in various embodiments, there may be no need for the ingress device's address to be transmitted upon the ingress link 208 to the switch fabric device 204.

Again, in a preferred embodiment, the header may include a single address field or portion. This is contrasted with a more typical (e.g., Ethernet, etc.) header address portion which includes both a source address and a destination address. In the illustrated embodiment, the switch fabric 204 may only include a source address field or portion as the destination of the segment is inherent or derivable from the link or SerDes 210 upon which the segment is transmitted. For example, in various embodiments, as a given link 210 may be hardwired to only one egress device (e.g., egress device 206n) any segments transmitted via the link can be assumed be going to or destined for the egress device 206n; therefore, space within the header may be conserved by forgoing a destination address field or portion thereof.

In various embodiments, upon receipt of the segment by the egress device 206, the egress device 202 may be configured to buffer the segment within a memory. In some embodiments, the egress device 202 may be configured to group the segments based upon the transmitting ingress device 202. In one embodiment, the address field of the header associated with each segment may include an indication of which ingress device 202 transmitted the segment.

In some embodiments, the egress device may reassemble the packet from the segments based upon the links used to receive each segment and the next link field of the header of each segment. For example, given a packet that includes three segments, the first segment may indicate that the next segment would be received via the twenty-seventh ($27^{th}$) link of the egress device 202. Therefore, the second segment will be determined as the segment that arrived via the $27^{th}$ link of the egress device 202. This second segment may indicate that the next segment may be received via the $35^{th}$ link of the egress device 202. Therefore, in one embodiment, the third and final segment may be determined to be the segment received via the $35^{th}$ link of the egress device. In such an embodiment, once the order of the three segments has been determined, the packet may be reassembled and subsequently transmitted for the system 200 to the next network device along the route to the packet's final destination network device.

In various embodiments, the header associated with each segment may include a start field or flag configured to indicate which segment is the first segment in a packet. In one embodiment, the header associated with each segment may include an end or final field or flag configured to indicate which segment is the final segment in a packet. In some embodiments, a known or predetermined value may be encoded within the next link field of the final segment to indicate that the segment is the final segment. Although, it is understood that the above are merely a few illustrative examples to which the disclosed subject matter is not limited.

In various embodiments, each ingress/egress device pair may have its own link sequence scope. In such an embodiment, an ingress device 202 may be configured to maintain a separate "next-link" state for each of the egress devices (e.g., egress devices 206, 206a, and 206n) in the system 200. Likewise, each egress device 202 may be configured to maintain a "next-link" state for each of the ingress devices (e.g., ingress device 202, 202a, and 202n) in the system 200. For example, in one embodiment that includes eight combined dual-mode ingress/egress devices, each device may maintain a table or list of 14 next-link states; two (one for ingress and one for egress) for each of the seven other ingress/egress devices in the system.

In various embodiments, some packets may include multi-cast data. In various embodiments, multi-cast data may include data that is transmitted from one source to many destinations, such that a simple ingress/egress one-to-one pairing does not exist. Instead, a one-to-many ingress/egress relationship may exist. In such an embodiment, the link sequence scope may be affected. In such an embodiment, an ingress device 202 may be configured to inform all of destination egress devices (e.g., both egress devices 206a and 206n) of a new next-link value. In various embodiments, this may aid all egress devices 206 with regards to their next-link state and assure or facilitate that each egress device 206 will use the correct sequence of links throughout the duration of the multicast transmission. In such an embodiment, the new next-link value may be conveyed via a dedicated message from the ingress device 202 to the egress devices 206 which does not otherwise convey any packet data. In various embodiments, this message may merely synchronize all of the egress devices next-link state for a particular ingress device. In various embodiments, at the completion of the multicast transmission, the next-link state of each egress device may once again change independently from one another on a per-source basis.

In various embodiments, a set or portion of address values may be reserved for intra-system device-to-device messaging. For example, in a system including devices having address values 0-124, the address values 125-127 may be configured to be used for intra-system device-to-device messaging. In one embodiment, these intra-system device-to-device messages may be broadcast to all devices within the system 200. In another embodiment, the addresses may indicate that the messages are only to be broadcast or transmitted to a sub-set of the system devices. In some embodiments, these intra-system device-to-device messages may include no user data, but instead convey configuration or synchronization messages such as the multi-cast message described above. Although, it is understood that the above is merely one illustrative example to which the disclosed subject matter is not limited.

In some embodiments, during system startup and/or in the event of a lost fragment or segment, the next-link state of the affected ingress and egress devices (e.g., devices 202 and 206n) may be re-synchronized. It is recognized that, in various embodiments, in a closed system, such as for example, system 200, the rate of segment or fragment loss may be very small.

In one embodiment, at system startup and possibly periodically thereafter, an ingress device 202 may be configured to transmit a series of synchronization (or more colloquially "sync") messages on each of its links. In such an embodiment, when it is time to transmit the synchronization messages, the next-link value of a segment that includes the end of a packet or, in another embodiment, a special null or empty segment may be used or employed to point or reset the next link field to the ingress device's 202 primary or lowest-numbered link (e.g., the $0^{th}$ link).

In various embodiments, a synchronization message may then be transmitted via that primary link with a next-link field value that points to the second or next-higher numbered link (e.g., the $1^{st}$ link). In some embodiments, this may continue until all of the ingress device's 202 links have been used to transmit a synchronization message. In one embodiment, the last synchronization message may use its next-link value to, as may be done during normal non-synchronization operation, point to the link to be used to convey the first segment of a data packet.

Conversely, an egress device 206n that has lost a fragment or segment due to, for example, transmission errors may, in one embodiment, suffer from a re-ordering buffer overflow as segments may be stored within the egress device's 206 buffer but may not be transmitted as the packet cannot be reassembled without the missing or lost segment. In such an embodiment, the egress device 206n may use synchronization messages as a "discard fragments up until here" indication. In such an embodiment, once an error occurs in the egress device 206n, it may discard all packet data in all of its reassembly buffers or lanes (e.g., one reassembly buffer or lane per interface per ingress device 202) until it has received a synchronization message. In one embodiment, once these synchronization messages have been received on all links from a particular ingress device (e.g., ingress device 202a), the reassembly of packet data from that same ingress device (e.g., ingress device 202a but not ingress device 202n) may resume; starting with the start of packet that appears on the link identified by the next-link value of the synchronization message received on the highest-numbered link.

In various embodiments, these synchronization messages or operations may be initiated automatically on a scheduled or periodic basis. In another embodiment, the synchronization messages may occur in response to an error indication in the system 200. In various embodiments, synchronization operations may be initiated often enough to allow for sub-millisecond error recovery, but not so often so as to materially affect system performance.

Figure 3:
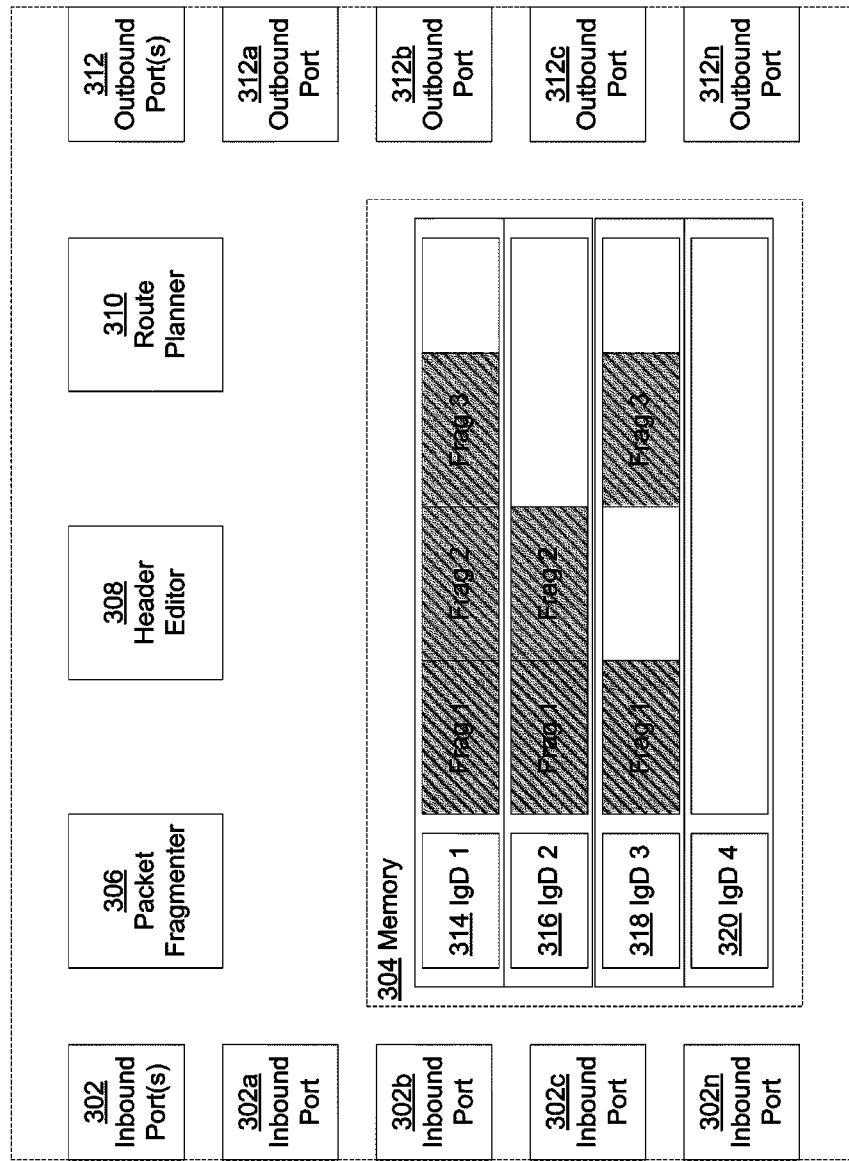
FIG. 3 is a block diagram of an example embodiment of a system in accordance with the disclosed subject matter.

FIG. 3 is a block diagram of an example embodiment of a system or apparatus 300 in accordance with the disclosed subject matter. In various embodiments, the system or apparatus 300 maybe included as a device (e.g., ingress device, egress device, switch fabric device) of the systems 100 and 200 of FIGS. 1 and 2, respectively. In various embodiments, a single integrated circuit (IC) or other device may be capable of operating in one or more of the three roles described above. In another embodiment, the apparatus or system 300 may be configured to act as a specialized device (e.g., an ingress/egress device).

In one embodiment, the apparatus or system 300 may include a plurality of inbound or ingress ports (e.g., inbound ports 302, 302a, 302b, 302c, and 302n), a plurality of outbound or egress ports (e.g., outbound ports 312, 312a, 312b, 312c, and 312n), a packet fragmenter 306, a header editor 308, a route planner 310, and a memory 304.

In various embodiments, each inbound port 302 may be configured to receive at least a portion of a packet (or other grouping, e.g., a frame) of data. In various embodiments, this data may have been transmitted by another networking device, or another device (e.g., switch fabric device, ingress/egress device, etc.) within the same system as the apparatus 300. In some embodiments, each inbound port 302 may be associated with a particular and corresponding link, such that each inbound port 302 may be identified and addressed by a link value.

In various embodiments, each outbound port 312 may be configured to transmit at least a portion of a packet (or other grouping, e.g., a frame) of data. In various embodiments, this data may have been transmitted to another networking device, or another device (e.g., switch fabric device, ingress/egress device, etc.) within the same system as the apparatus 300. In some embodiments, each outbound port 312 may be associated with a particular and corresponding link, such that each outbound port 312 may be identified and addressed by a link value.

In various embodiments, the packet fragmenter may be configured to divide the received portion of the packet into a plurality of segments, as described above. In some embodiments, the route planner 310 may be configured to determine an appropriate egress device to receive the packet and ultimately transmit the packet towards the packet's final destination device, as described above.

In one embodiment, the apparatus 300 may include a header editor 308 configured to, for each packet segment, edit or create a header that includes an address field that indicates the address of the egress device determined by the route planner 310. In some embodiments, the header editor 308 may also be configured to edit the header to include a next link field that indicates the inbound port of the egress device that will be used or employed to receive a next segment of the packet, as described above. In various embodiments, these segments may subsequently be transmitted by at least one outbound port 312.

While the above describes an embodiment, in which the apparatus 300 acts as an ingress device, in some embodiments, the apparatus 300 may also or alternatively act as a switch fabric device.

In such an embodiment, the inbound ports 302 may be configured to receive one or more packet segments. In some embodiments, the route planner 310 may be configured to read the address field of the header associated with the received segment to determine the egress device for which the segment is destined, as described above. In various embodiments, the header editor 308 may be configured to edit the header associated with the received segment to include an address field that indicates the address of the ingress device that transmitted the segment, as described above. In one embodiment, the outbound ports 312 may be configured to transmit the received segment to the indicated egress device via a link indicated in a previously received segment, as described above.

In another embodiment, the apparatus 300 may act as an egress device, as described above. In such an embodiment, the inbound ports 302 may be configured to receive one or more packet segments. In one embodiment, the memory 304 may be configured to store the received segment. In some embodiments, the memory 304 may be configured to store or arrange received segments into reassembly buffers or lanes that are grouped by transmitting ingress device (e.g., reassembly or grouping buffers or lanes 314, 316, 318, and 320). The illustrated embodiment shows the apparatus 300 in a state in which a number of fragments or segments from various ingress devices have been received. As described above, the memory 304 or, in one embodiment, the packet fragmenter 306 may assemble the segments into a packets based upon the ordering information included in the next link fields. In various embodiments, the outbound ports 312 may be configured to transmit the assembled packet to the indicated network or destination device, as described above. In various embodiments, upon transmittal from the apparatus 300 the packet and its associated segments may be removed or cleared from the memory 304, as described above.

In various embodiments, the apparatus 300 or the sub-components thereof may perform the multi-cast and link synchronization actions described above. In some embodiments, this may include the transmittal of control messages via the outbound ports 312 and receipt thereof via the inbound ports 302.

FIG. 4 is a block diagram of an example embodiment of a packet 402 in accordance with the disclosed subject matter. In various embodiments, the packet 402 may be received by an ingress device, as described above. In some embodiments, the packet 402 may include a preamble portion 404, a start frame delimiter field (SFD) 406, and a number of Medium Access Control (MAC) header(s) and user data 408; although, it is understood that the above is merely one illustrative example to which the disclosed subject matter is not limited.

As described above, in one embodiment, the ingress device may fragment or divide the packet into one or more segments of fragments (e.g., packet segments 410, 412, and 414, etc.). In some embodiments, each packet fragment or segment may include a segment header portion 416 and a segment data portion 418 that includes the fragmented portion of the packet 402.

In various embodiments, the fragment or segment header portion 416 may include a sequence field 422, a start flag or field 424, and end flag or field 426, and an error correction portion 428. In one embodiment, the sequence field 422 may be configured to indicate the order in which the segments or fragments 410, 412 and 414, etc. may be reassembled. In various embodiments, the sequence portion 422 may include 14-bits; although, it is understood that the above is merely one illustrative example to which the disclosed subject matter is not limited. In one embodiment, the start field 424 and end field 426 may respectively indicate that the segment 410 is the first and/or last segment associated with a particular packet 402. As described above, these fields 424 and 426 may indicate to an egress device that a packet 402 has been finished or otherwise aid in reassembling the packet 402. In some embodiments, the segment header 416 may include an error correction portion 428 (e.g., a cyclic redundancy check) configured to facilitate the detection and/or correction of any transmittal errors. In various embodiments, this error correction portion 428 may include 8-bits; although, it is understood that the above is merely one illustrative example to which the disclosed subject matter is not limited.

In various embodiments, the segment header fields 430 may include header sequence portion 422. In one embodiment, the segment header fields 430 may include an address portion 432 and a next link portion 434. In various embodiments, the address portion 432 may indicate either the egress device to which the segment is transmitted or the ingress device from which the segment was transmitted, as described above. In some embodiments, the content of the address portion 432 may be edited by a switch fabric device, as described above. In various embodiments, the address portion 432 may include 7-bits or space for approximately 128 devices; although, it is understood that the above is merely one illustrative example to which the disclosed subject matter is not limited. As described above, in one embodiment, some addresses may be reserved, for example, for special control messages.

In one embodiment, the next link portion 434 may include an indication of which link will be used or employed to transmit the next segment (e.g., packet segment 412) of the packet 402. In various embodiments, the next link portion 434 may include 7-bits or space for approximately 128 links; although, it is understood that the above is merely one illustrative example to which the disclosed subject matter is not limited. As described above, in one embodiment, some next link values may be reserved, for example, for special control messages. In one embodiment, the next link portion 434 may include a number of bits equal to the binary logarithm of the number of possible links to the egress device from the ingress device. In another embodiment, the next link portion 434 may include a field sufficiently large to uniquely identify all possible links to the egress device from the ingress device.

FIG. 5 is a series of flow charts of an example embodiment of a technique in accordance with the disclosed subject matter. In various embodiments, the technique 500 may be used or produced by the systems such as those of FIGS. 1, 2, and 3.

Figure 5C:
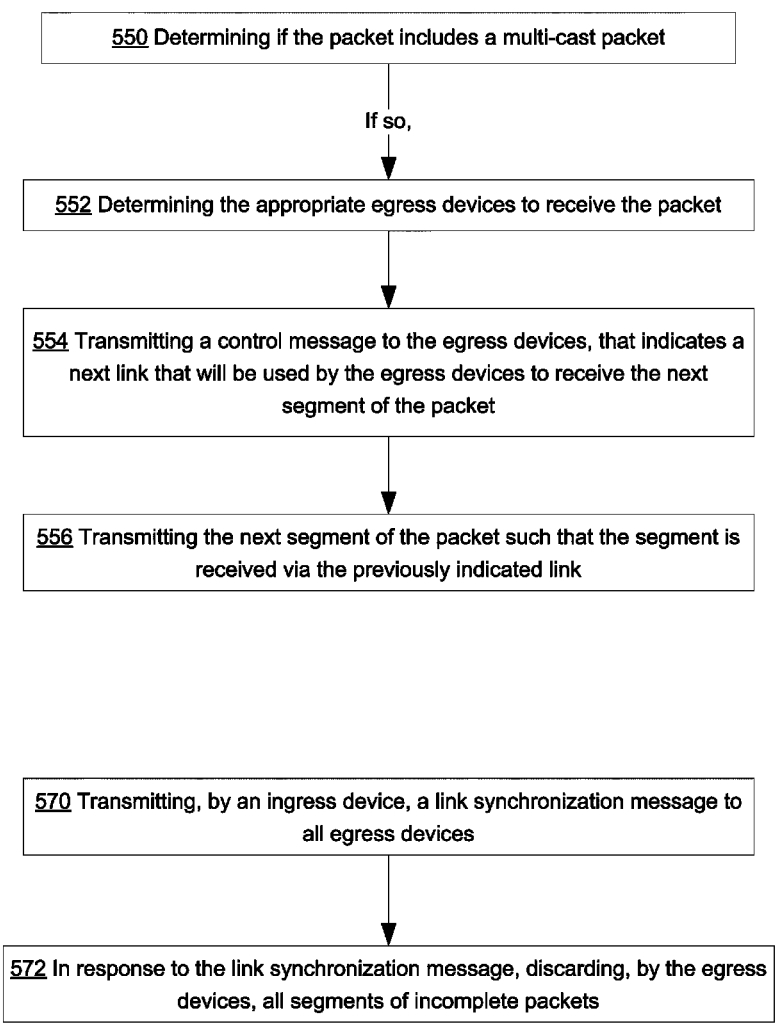
FIG. 5 is a series of flow charts of an example embodiment of a technique in accordance with the disclosed subject matter.

Furthermore, portions of technique 500 may be used with or produce data packets or segments such as that of FIG. 4. Although, it is understood that the above are merely a few illustrative examples to which the disclosed subject matter is not limited. It is understood that the disclosed subject matter is not limited to the ordering of or number of actions illustrated by technique 500. Furthermore, it is understood that FIGS. 5a, 5b and 5c represent a single flowchart illustrated on multiple pages and connected via the connector of Block 501, herein the multiple pages will simply be referred to as FIG. 5. Also, FIG. 5c displays additional blocks or actions that may be performed in some embodiments of technique 500.

Block 502 illustrates that, in one embodiment, at least a portion of a packet of data may be received, as described above. In various embodiments, this may be received by an ingress device, as described above. In various embodiments, one or more of the action(s) illustrated by this Block may be performed by the ingress devices 108 or 202 of FIGS. 1 and 2, or the inbound ports 302 of FIG. 3, as described above.

Block 504 illustrates that, in one embodiment, 504 a determination may be made as to the appropriate egress device to receive the packet, as described above. In various embodiments, one or more of the action(s) illustrated by this Block may be performed by the ingress devices 108 or 202 of FIGS. 1 and 2, or the route planner 310 of FIG. 3, as described above.

Block 506 illustrates that, in one embodiment, the received portion of the packet may be divided into a plurality of segments, as described above. In various embodiments, the segments may include a plurality of substantially equally sized segments and a final smaller segment, as described above. In various embodiments, one or more of the action(s) illustrated by this Block may be performed by the ingress devices 108 or 202 of FIGS. 1 and 2, or the packet fragmenter 306 of FIG. 3, as described above.

As illustrated by FIG. 5, a number of subsequent actions or Blocks may be preformed iteratively or in substantially in parallel for each segment. Other illustrated Blocks describe actions performed on the plurality of segments as opposed to detailing each individual segment. It is understood that the above are merely a few illustrative examples to which the disclosed subject matter is not limited.

Block 508 illustrates that, in one embodiment, a header or header portion of each segment may be edited or generated to include an address field that indicates the address of the egress device, as described above. Block 510 illustrates that, in one embodiment, the header may be edited to include a next link field that indicates a link that will be used to transmit the next segment of the packet, as described above. In various embodiments, one or more of the action(s) illustrated by this Block may be performed by the ingress devices 108 or 202 of FIGS. 1 and 2, or the header editor 308 of FIG. 3, as described above.

Block 512 illustrates that, in one embodiment, the current segment and header may be transmitted to the egress device via the link indicated in the next link field of the header of a preceding segment, as described above. In various embodiments, one or more of the action(s) illustrated by this Block may be performed by the ingress devices 108 or 202 of FIGS. 1 and 2, or the outbound port 312 of FIG. 3, as described above.

Block 520 illustrates that, in one embodiment, a current segment transmitted from the ingress device to the egress device may be received by a switch fabric device, as described above. In various embodiments, one or more of the action(s) illustrated by this Block may be performed by the switch fabric devices 106 or 204 of FIGS. 1 and 2, or the inbound port 302 of FIG. 3, as described above.

Block 522 illustrates that, in one embodiment, the address field of the segment may be edited to indicate the address of the ingress device, as described above. In various embodiments, one or more of the action(s) illustrated by this Block may be performed by the switch fabric devices 106 or 204 of FIGS. 1 and 2, or the header editor 308 of FIG. 3, as described above.

Block 524 illustrates that, in one embodiment, the current segment may be transmitted to the egress device using or via the link indicated in the next link field of the header of the preceding segment, as described above. In various embodiments, one or more of the action(s) illustrated by this Block may be performed by the switch fabric devices 106 or 204 of FIGS. 1 and 2, or the outbound port 312 of FIG. 3, as described above.

Block 526 illustrates that, in one embodiment, a plurality of segments transmitted from at least one ingress device may be received, as described above. In various embodiments, one or more of the action(s) illustrated by this Block may be performed by the egress devices 108 or 206 of FIGS. 1 and 2, or the inbound port 302 of FIG. 3, as described above.

Block 528 illustrates that, in one embodiment, the segments may be grouped based upon the transmitting ingress device, as described above. In various embodiments, one or more of the action(s) illustrated by this Block may be performed by the egress devices 108 or 206 of FIGS. 1 and 2, or the memory 304 of FIG. 3, as described above.

Block 530 illustrates that, in one embodiment, the segments of each group may be ordered or reassembled based upon the link used to transmit each segment and the next link field of the header of each segment, as described above. In various embodiments, one or more of the action(s) illustrated by this Block may be performed by the egress devices 108 or 206 of FIGS. 1 and 2, or the memory 304 or packet fragmenter 306 of FIG. 3, as described above.

Block 550 illustrates that, in one embodiment, a determination may be made as to whether or not the received packet of Block 502 includes a multi-cast packet, as described above. Block 552 illustrates that, in one embodiment, if so the appropriate egress devices to receive the packet may be determined, as described above. Further, Block 554 illustrates that, in one embodiment, a control message may be transmitted to the egress devices that indicates a next link that will be used by the egress devices to receive the next segment of the packet, as described above. Block 556 illustrates that, in one embodiment, the next segment of the packet may be transmitted such that the segment is received via the previously indicated link, as described above. In various embodiments, one or more of the action(s) illustrated by this Block may be performed by the ingress devices 108 or 202 of FIGS. 1 and 2, or the route planner 310 or outbound ports 312 of FIG. 3, as described above.

Block 560 illustrates that, in one embodiment, a link synchronization message may be transmitted to all egress devices, as described above. Block 562 illustrates that, in one embodiment, the link synchronization message may cause the receiving egress devices to discard all segments of incomplete packets, as described above. In various embodiments, transmitting may include transmitting a series of control messages. In various embodiments, the series may sequentially utilize all links to the egress devices. In some embodiments, each control message may include a next link field that indicates the next sequential link that will be used to transmit the next control message, as described above. In various embodiments, one or more of the action(s) illustrated by this Block may be performed by the ingress devices 108 or 202 of FIGS. 1 and 2, or the route planner 310 or outbound ports 312 of FIG. 3, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
   receiving at least a portion of a packet of data by an ingress device;
   determining an egress device to receive the packet;
   dividing the at least the portion of the packet into a plurality of segments; and
   transmitting the at least the portion of the packet to the egress device via a plurality of links, wherein transmitting includes, for each segment:
      editing a header to include an address field that indicates the address of the egress device, wherein the header is associated with a current segment,
      editing the header to include a next link field that indicates a link that will be used to transmit a next segment of the packet, wherein the header is exclusive of a sequence number, and
      transmitting the current segment and header to the egress device via the link indicated in the next link field of the header of a preceding segment that was transmitted via a preceding link that is different than the link.

2. The method of claim 1 wherein editing the next link field includes editing a field sufficiently large to uniquely identify all possible links to the egress device from the ingress device.

3. The method of claim 1 wherein the next link field includes a number of bits equal to the binary logarithm of the number of possible links to the egress device from the ingress device rounded up to the next integer.

4. The method of claim 1 further including:
   receiving, by a switch fabric device, a current segment transmitted from the ingress device to the egress device;
   editing the address field to indicate the address of the ingress device; and
   transmitting the current segment to the egress device using the link indicated in the next link field of the header of the preceding segment.

5. The method of claim 1 further including:
   receiving a plurality of segments transmitted from at least one ingress device;
   grouping the segments based upon the transmitting ingress device; and
   ordering the segments of each group based upon the link used to transmit the each segment and the next link field of the header of each segment.

6. The method of claim 1 further including:
   determining if the packet includes a multi-cast packet, and if so, determining the egress devices to receive the packet;
   transmitting a control message to the egress devices, that indicates a next link that will be used by the egress devices to receive the next segment of the packet; and
   transmitting the next segment of the packet such that the segment is received via the previously indicated link.

7. The method of claim 1 further including:
transmitting, by an ingress device, a link synchronization message to all egress devices; and
in response to the link synchronization message, discarding, by the egress devices, all segments of incomplete packets.

8. The method of claim 7 wherein transmitting a link synchronization message includes:
transmitting a series of control messages;
wherein the series sequentially utilizes all links to the egress devices; and
wherein each control message includes a next link field that indicates the next sequential link that will be used to transmit the next control message.

9. The method of claim 1 wherein the next link field indicates the link port of the egress device that will be used to receive the next segment of the packet.

10. An apparatus comprising:
a plurality of inbound ports configured to receive at least a portion of a packet of data;
a packet fragmenter configured to divide the received portion of the packet into a plurality of segments;
a route planner configured to determine an egress device to receive the packet, wherein the egress device includes a plurality of inbound ports;
a header editor configured to, for each packet segment:
edit a header to include an address field that indicates the address of the egress device determined by the route planner, wherein the header is associated with a current segment, and
edit the header to include a next link field that indicates the inbound port of the egress device that will be used to receive a next segment of the packet, wherein the header is exclusive of a sequence number; and
a plurality of outbound ports configured to:
transmit the portion of the packet of data to the egress device via a plurality of inbound ports, wherein for each current segment the current segment is transmitted to the inbound port of the egress device indicated in the next link field of the header of a respective preceding segment.

11. The apparatus of claim 10 wherein the plurality of inbound ports is configured to
receive a current segment transmitted from an ingress device to an egress device;
wherein the header editor is configured to edit the address field to indicate the address of the ingress device; and
wherein the plurality of outbound ports is configured to transmit the current segment to the egress device via an inbound port of the egress device indicated in a next link field of the header of a preceding segment.

12. The apparatus of claim 10 wherein the plurality of inbound ports is configured to
receive a plurality of segments transmitted from at least one ingress device; and
wherein the apparatus further comprises a memory configured to:
buffer the received segments,
group the segments based upon the transmitting ingress device, and
assemble the segments of each group into a packet, based upon the inbound port used to receive the each segment and the next link field of the header of each segment.

13. The apparatus of claim 12 wherein the plurality of outbound ports is configured to, when a packet is fully assembled:
transmit the packet to a destination via one of the outbound ports; and
instruct the memory to remove the fully assembled packet.

14. The apparatus of claim 10 wherein the route planner is configured to:
determine if the packet includes a multi-cast packet, and if so, determine the plurality of egress devices to receive the packet; and
wherein the plurality of outbound ports is configured to, if the packet includes a multi-cast packet:
transmit a control message to the egress devices, that indicates a next inbound ports of the egress devices that will be used by the egress devices to receive the next segment of the packet, and
transmit the next segment of the packet such that the segment is received via the previously indicated inbound port of the egress devices.

15. The apparatus of claim 10 wherein the plurality of outbound ports is configured to:
transmit a link synchronization message to all egress devices of a system that includes the apparatus, and
wherein the link synchronization indicates that the egress devices should discard any non-fully assembled packets buffered by the egress device.

16. The apparatus of claim 10 where the apparatus is configured to operate in at least one or at least three modes:
a first mode, in which the apparatus functions as an ingress device configured to:
receive at least a portion of a packet of data via an inbound port,
divide the portion of the packet into a plurality of segments, and
transmit the segments to a selected egress device using a header that includes an address field and a next link field;
a second mode, in which the apparatus functions as a switch fabric device configured to:
receive a plurality of segments from an ingress device and directed to an egress device,
edit the address field of the segment to indicate the address of the ingress device, and
transmit the segment to the egress device using the link indicated in a prior segment from the ingress device and directed to the egress device; and
a third mode, in which the apparatus functions as an egress device configured to:
receive a plurality of segments transmitted from at least one ingress device buffer the segments in the memory, group the segments based upon the transmitting ingress device, and
assemble the segments of each group into a packet, based upon the inbound port used to receive the each segment and the next link field of the header of each segment.

17. A system comprising:
a plurality of ingress devices, wherein each ingress device is configured to:
divide a received packet of data into segments,
store a separate next link state for each of a plurality of egress devices,
transmit the segments to a selected egress device of the plurality of egress devices, via a plurality of links of at least one switch fabric, and using a header that includes an address field and a next link field, wherein the next link field is determined based at least in part on the next link state stored for the selected egress device, the next link field indicates at least one link of the plurality of links that will be used to transmit a next segment of the packet, and the header is exclusive of a sequence number, and update the next link state stored for the selected egress device;

the at least one switch fabric including the plurality of links and configured to receive at least a portion of the segments from at least some of the plurality of the ingress devices, and for each segment of the at least the portion of the segments:

edit the address field of the segment to indicate the address of the one of the plurality of ingress devices that transmitted the segment, and transmit the segment to at least one of the plurality of egress devices using the link of the plurality of links indicated in a prior segment transmitted by the at least one of the plurality of ingress devices and directed to the at least one of the plurality of egress devices; and the plurality of egress devices, wherein each of the plurality of egress devices is configured to:

maintain a separate next link state for each of the plurality of ingress devices, receive the segments transmitted from the at least some of the plurality of ingress devices, at least one of the segments transmitted over a different link of the plurality of links than at least one other of the segments, buffer the segments in a memory, group the segments based upon the at least some of the plurality of ingress devices that transmitted the segments, and assemble the segments of each group into a packet, based at least in part upon the link of the plurality of links used to receive each of the segments, the next link field of the header of each of the segments, and the separate next link state stored for each of the at least some of the plurality of ingress devices.

18. The system of claim 17 wherein each ingress device is configured to:

determine if the packet includes a multi-cast packet, and if so, determine the egress devices to receive the packet;

transmit a control message to the egress devices, that indicates a next link that will be used by the egress devices to receive the next segment of the packet; and transmitting the next segment of the packet such that the segment is received via the previously indicated link.

19. The system of claim 17 wherein each ingress device is configured to transmit a link synchronization message to all egress devices; and wherein each egress device is configured to, in response to the link synchronization message, discard all received segments of any incomplete packets.

* * * * *